(No Model.)
J. A. WILLIAMS.
ANIMAL TRAP.
No. 269,766. Patented Dec. 26, 1882.
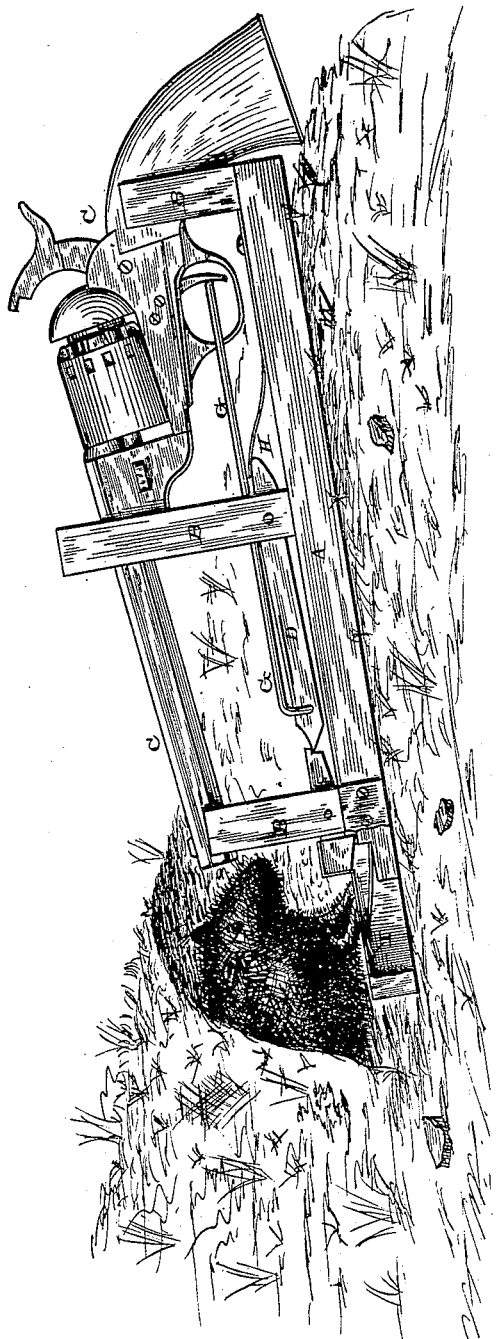
Witnesses:
J. E. Clark.
W. H. Kerr.
Inventor:
Jas. A. Williams
per
F. A. Lehmann
Attorney.

UNITED STATES PATENT OFFICE.

JAMES A. WILLIAMS, OF FREDONIA, TEXAS.

ANIMAL-TRAP.

SPECIFICATION forming part of Letters Patent No. 269,766, dated December 26, 1882.

Application filed August 21, 1882. (No model.)

*To all whom it may concern:*

Be it known that I, JAS. ALEXANDER WILLIAMS, of Fredonia, in the county of San Saba and State of Texas, have invented certain new and useful Improvements in Animal-Traps; and I do hereby declare the following to be a full, clear, and exact description of the invention, such as will enable others skilled in the art to which it pertains to make and use it, reference being had to the accompanying drawing, which forms part of this specification.

My invention relates to an improvement in animal-traps; and it consists in the combination of a suitable frame upon which a revolver or pistol is secured, a treadle which is secured to the front end of this frame, and a suitable spring and levers, by which the firearm is discharged when the animal steps upon the treadle, as will be more fully described hereinafter.

The object of my invention is to provide a means by which animals which burrow in the ground can be destroyed, and which trap will give an alarm each time that it goes off, so that it can be reset.

The accompanying drawing represents the side elevation of my invention complete.

A represents a suitable board, from which rises the three standards B, upon which the revolver or pistol C is supported in position. Pivoted to the middle standard is the lever D, and fastened in any suitable manner to the front end of this lever is the rod G, which extends backward and bears against the trigger of the fire-arm. Bearing upon the rear end of the lever D is a suitable spring, H, which will throw the front end of the lever D upward as soon as the lever is left free to move, and in throwing up the front end of the lever D the rod connected thereto is forced backward, so as to push back the trigger. Secured to the front end of the board A is a suitable spring-actuated treadle, I, the rear end of which forms a trigger to catch over the front end of the lever D. This treadle is first made to catch over the front end of the lever D, which sets the trap, and then the treadle is forced into the animal's hole or burrow. The animal, in coming out, steps upon the treadle and presses the treadle down, which releases the lever, when the spring immediately causes the lever to fly upward and the rod then forces back the trigger and causes the fire-arm to go off, killing the animal that is in front of it.

This invention may also be used in connection with a door or window, so as to kill any person or thing opening the door or window to which it is attached.

I am aware that burglar-alarms of various kinds have been used, and which have been connected to windows and doors in such a manner that the opening of the window or door causes a pressure upon a lever which discharges a fire-arm; but in no case have the parts been arranged and combined as here shown and described.

Having thus described my invention, I claim—

The combination of a suitable frame provided with standards, a fire arm, the lever D, having the rod connected to its front end to operate the trigger, a spring, and a treadle which forms a trigger, substantially as shown and described.

In testimony whereof I affix my signature in presence of two witnesses.

JAMES ALEXANDER WILLIAMS.

Witnesses:
JOHN CALDWELL CALHOUN,
BASSIL MANLY BUNTYR.